(12) United States Patent
Hermanson

(10) Patent No.: US 6,366,286 B1
(45) Date of Patent: Apr. 2, 2002

(54) IMAGE DATA EDITING

(75) Inventor: David W. Hermanson, Montreal (CA)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 09/283,249

(22) Filed: Apr. 1, 1999

(30) Foreign Application Priority Data

Apr. 3, 1998 (GB) ............................................. 9807165

(51) Int. Cl.[7] ............................................. G06T 15/00
(52) U.S. Cl. ..................................................... 345/473
(58) Field of Search ............................... 345/418, 473, 345/474, 475

(56) References Cited

U.S. PATENT DOCUMENTS

| 4,121,253 A | 10/1978 | McCoy |
| 4,855,834 A | 8/1989 | Cawley et al. |
| 4,954,898 A | 9/1990 | Nakata |
| 5,184,222 A | 2/1993 | Yanagisawa |
| 5,515,110 A | 5/1996 | Alig et al. |

FOREIGN PATENT DOCUMENTS

| EP | 0438061 A1 | 7/1991 |
| GB | 2219170 A | 11/1989 |
| GB | 2272127 A | 5/1994 |

*Primary Examiner*—Cliff N. Vo
(74) *Attorney, Agent, or Firm*—Gates & Cooper LLP

(57) ABSTRACT

An image data editing facility produces a sequence of output image frames. A wipe animation is produced over a sequence of output frames such that an increasing proportion of the output image is derived from a second sequence of frames and a decreasing proportion of the output image is derived from a first sequence of frames, under the control of a moving boundary defined by a wipe animation. The rate of expansion of boundary is controlled with reference to an animation parameter and the animation parameter is derived from processing at least one stored position parameter with reference to a selected animation starting location.

40 Claims, 14 Drawing Sheets

IMAGE DATA EDITING

FIELD OF THE INVENTION

The present invention relates to image data editing apparatus configured to produce a sequence of output image frames. The present invention also relates to a method of editing image data frames and a computer-readable medium having computer-readable instructions executable by a computer such that said computer performs steps for editing image data frames.

BACKGROUND TO THE INVENTION

A computer-based image data editing system is disclosed in United Kingdom patent application number 2 311 394, in the name of the present Assignee. Sequences are formed of collated segments representing audio or video scenes and the architecture of these scenes may be displayed as sequence tracks for ordering the segments of the multi-media sequence. In addition, process tracks are included for applying transformations and/or animations to some of these segments. The output of the process tracks may be supplied to other process tracks and/or to a sequence track. Thus, the system facilitates a method of recording image data in combination with the data representing processes to be performed upon the image data.

A known type of process for application to image data is that of a wipe. An image data editing apparatus may be of the type configured to produce a sequence of output image frames and may include image storage means for storing a first input sequence of image frames and a second input sequence of image frames. Processing means may be configured to generate a wipe animation over a sequence of output frames such that an increasing proportion of the output image is derived from the second sequence and a decreasing proportion of the output image is derived from the first sequence.

A system for generating computer-based wipes between scenes is disclosed in U.S. Pat. No. 5,515,110. When implemented in this way, it is possible to generate wipe shapes with reference to a stored bitmap in computer memory, thereby allowing an editor to design wipes as required. However, in an on-line system, it is likely that a plurality of standard wipe shapes would be available and the wiping process may be driven with reference to vector-based boundary animations.

Boundary animations may be controlled with reference to an animation parameter. However, animation parameters suitable for implementing a wipe originating from the centre of a frame may be inappropriate when the wipe is initiation from other locations within the frame. After a wipe operation has completed, the whole of image frame should be taken up by image data derived from the new frame source, with none of the old frame source image data remaining. However, if the initiating position of the wipe is moved from its central location, it is possible that the wipe boundary may not have fully extended beyond the extent of the image frame at the end of the wipe operation, resulting in a sudden transition to a full image of the new data source. This problem may overcome by scaling the wipe animation parameter or by applying a bias to said parameter. However, if the scaling of the animation parameter is too great, the wipe will complete early, thereby introducing a variability in terms of the duration of the wipe, if the scaling of the animation parameter is too great, the wipe will complete early, thereby introducing a variability in terms of the duration of the wipe, to the extent that it becomes difficult for an operator to accurately define a wipe length. Consequently, when modifying an animation parameter, care must be taken in terms of controlling the extent of modification in order to obtain the required result.

SUMMARY OF THE INVENTION

According to a first aspect of the present invention, there is provided image data editing apparatus configured to produce a sequence of output image frames, including image storage means for storing a first input sequence of image frames and a second input sequence of image frames; data storage means for storing a plurality of position parameters in which each of said position parameters relates to a specific position within an image frame; processing means configured to generate a wipe animation over a sequence of output frames such that an increasing proportion of the output image is derived from said second sequence and a decreasing proportion of the output image is derived from said first sequence, under the control of a moving boundary defined by a wipe animation, wherein the rate of expansion of said boundary is controlled with reference to an animation parameter; and said animation parameter is derived by processing at least one of said stored position parameters with reference to a selected animation starting location.

In a preferred embodiment, the data storage means is configured to store a plurality of position parameters relating to specific positions within an image frame, wherein said specific positions are predefined such that similar positions are adopted for each of a plurality of wipe animations. Preferably, the image storage means is configured such that position parameters are stored for nine locations, that may be at the top-left, top-center, top-right, left-center, central-center, right-center, bottom-left, bottom-center and bottom-right, with reference to a viewing screen.

According to a second aspect of the present invention, there is provided a method of editing image data to produce a sequence of output image frames, in which a first input sequence of image frames and a second input sequence of image frames are stored in image storage means, a plurality of position parameters relating to specific locations within an image frame are stored in data storage means, and processing means are configured to perform the steps of: generating a wipe animation over a sequence of output frames such that an increasing proportion of the output image is derived from said second sequence and a decreasing proportion of the output image is derived from said first sequence, under the control of a moving boundary defined by a wipe animation; controlling the rate of expansion of said boundary with reference to an animation parameter, and deriving said animation parameter by processing at least one of said stored position parameters with reference to a selected animation starting location.

DETAILED DESCRIPTION OF THE PREFERRED EMBODIMENTS

Figure 1:
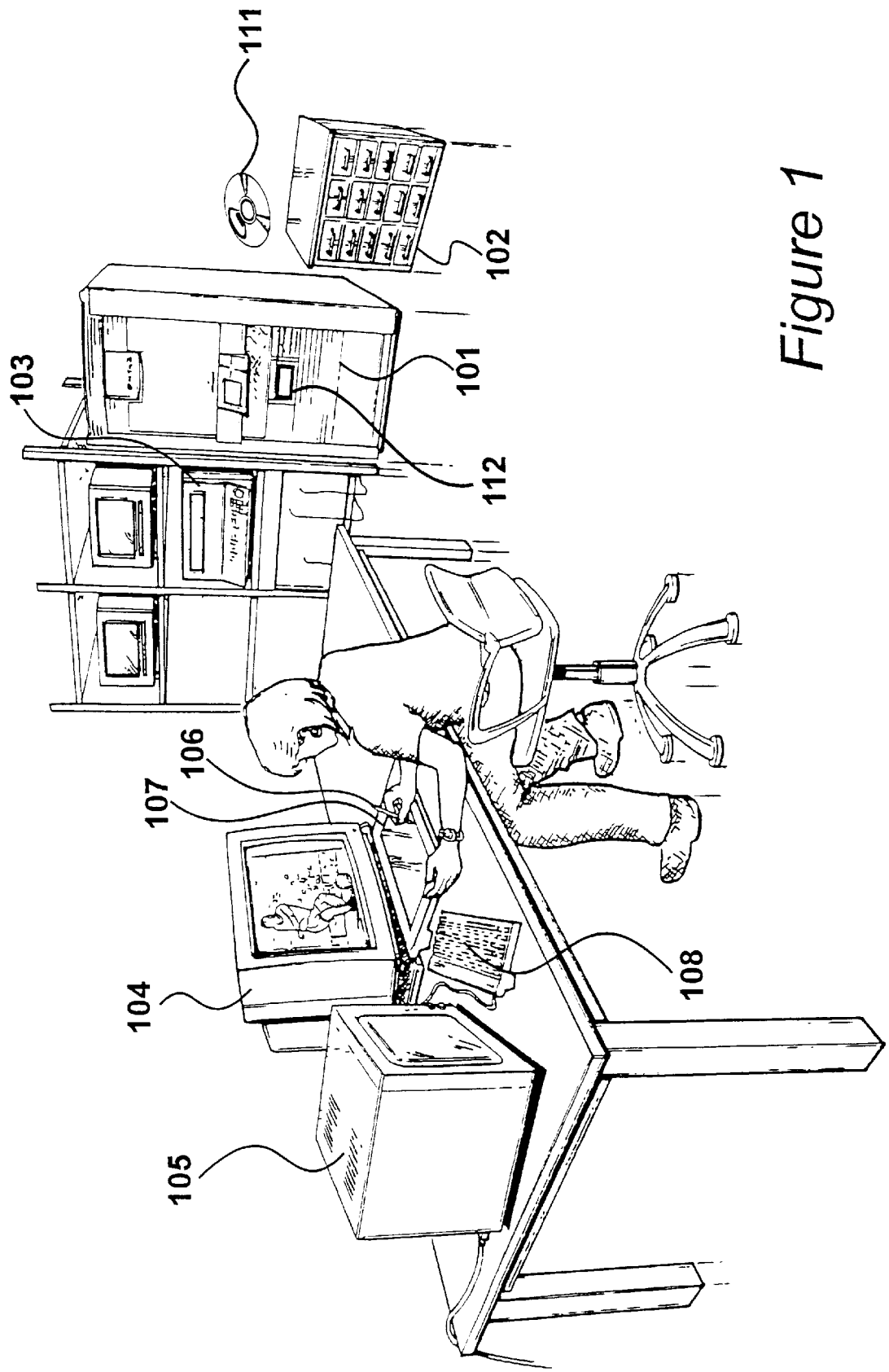
FIG. 1 shows a digital video/film editing suite, including processing devices, storage devices, display devices and manually operable input devices.

An image data editing system is shown in FIG. 1, including an Onyx2™ programmable computer 101 to provide a processing system. Processing system 101 receives digital image frame data via an image data store 102. The processing system 101 also includes internal storage devices, primarily intended for program storage and other data storage, along with peripheral reading devices for reading media, such as CD ROM's, defining executable instructions for the Onyx2™ computer.

New image source data is supplied to image data store 102 via digital video tape recorder 103 and other bulk storage devices. Similarly, process data may be written to video recorder 103.

Image data is displayed to an operator by means of a visual display unit 104, that is also configured to display control user interfaces. In addition, sequences of image frames, usually referred to as "clips" may also be displayed via a high quality broadcast monitor 105. An operator controls the system by means of a stylus 106 applicable to a touch table 107 and also via a keyboard 108.

Operating instructions executable by the processing system 101 are received by means of a computer-readable medium such as a CD ROM 111 receivable within a CD ROM player 112.

Figure 2:
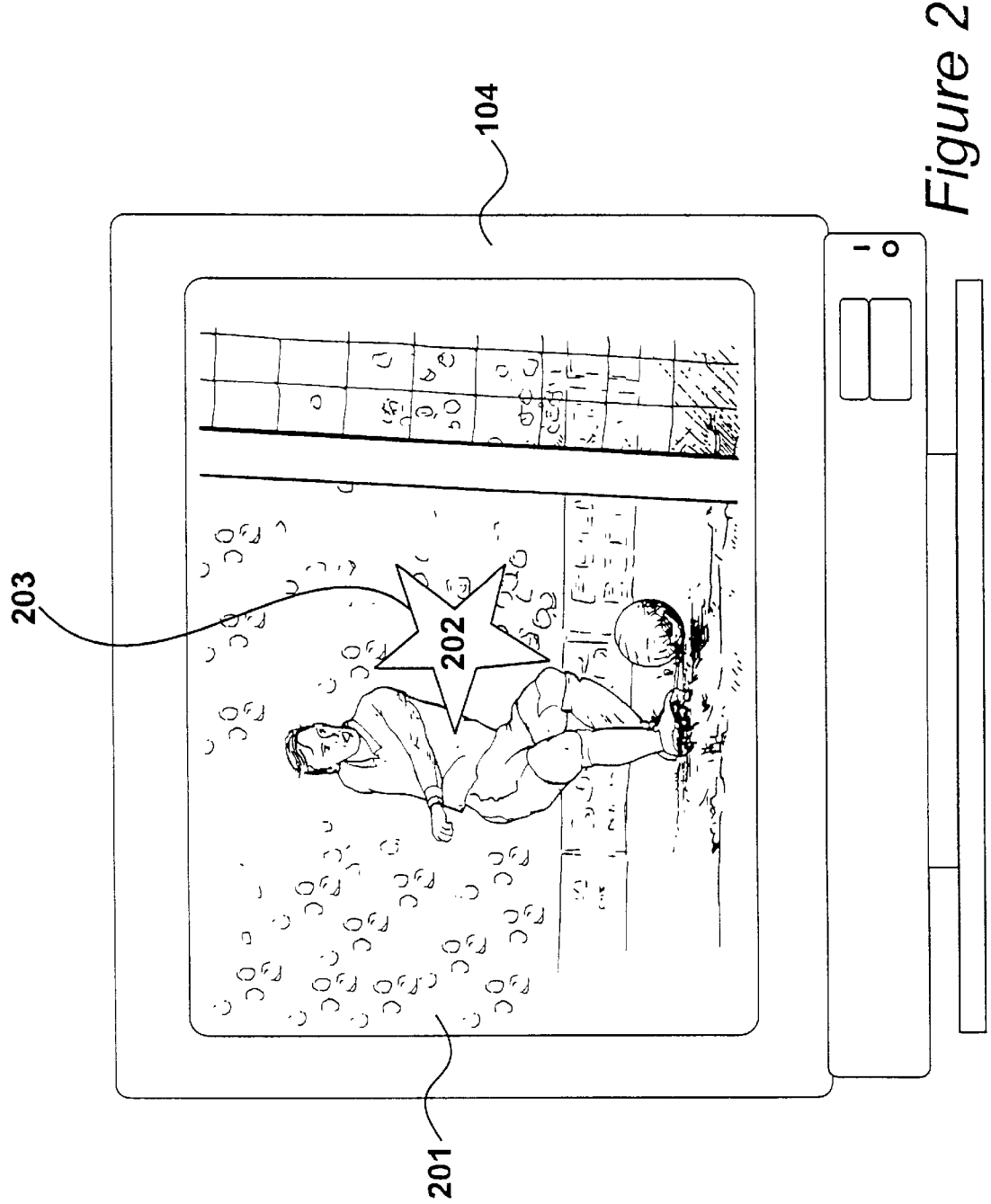
FIG. 2 shows an image of the type displayed on the display device identified in FIG. 1.

A wipe animation is performed over a sequence of output frames. During the wipe, an increasing proportion of the output image is derived from a second sequence of input frames and a decreasing proportion of the output image is derived from a first sequence of input frames, under the control of a moving boundary defined by a wipe animation. A wipe of this type is illustrated in FIG. 2, as displayed on display VDU 104.

Output image frames are derived from a first input sequence and from a second input sequence. The first input sequence displays a background image 201, with a second input sequence providing the new foreground image 202. Foreground image 202 is bounded by a shape boundary 203 and over the duration of the wipe, shape boundary 203 expands so as to reveal the totality of the new foreground image. The movement of the shape boundary is controlled in response to animation parameters, which in turn ensure that the wipe is performed at an appropriate rate, such that the whole of the foreground image makes up the output image frames after the wipe has been completed.

Figure 3:
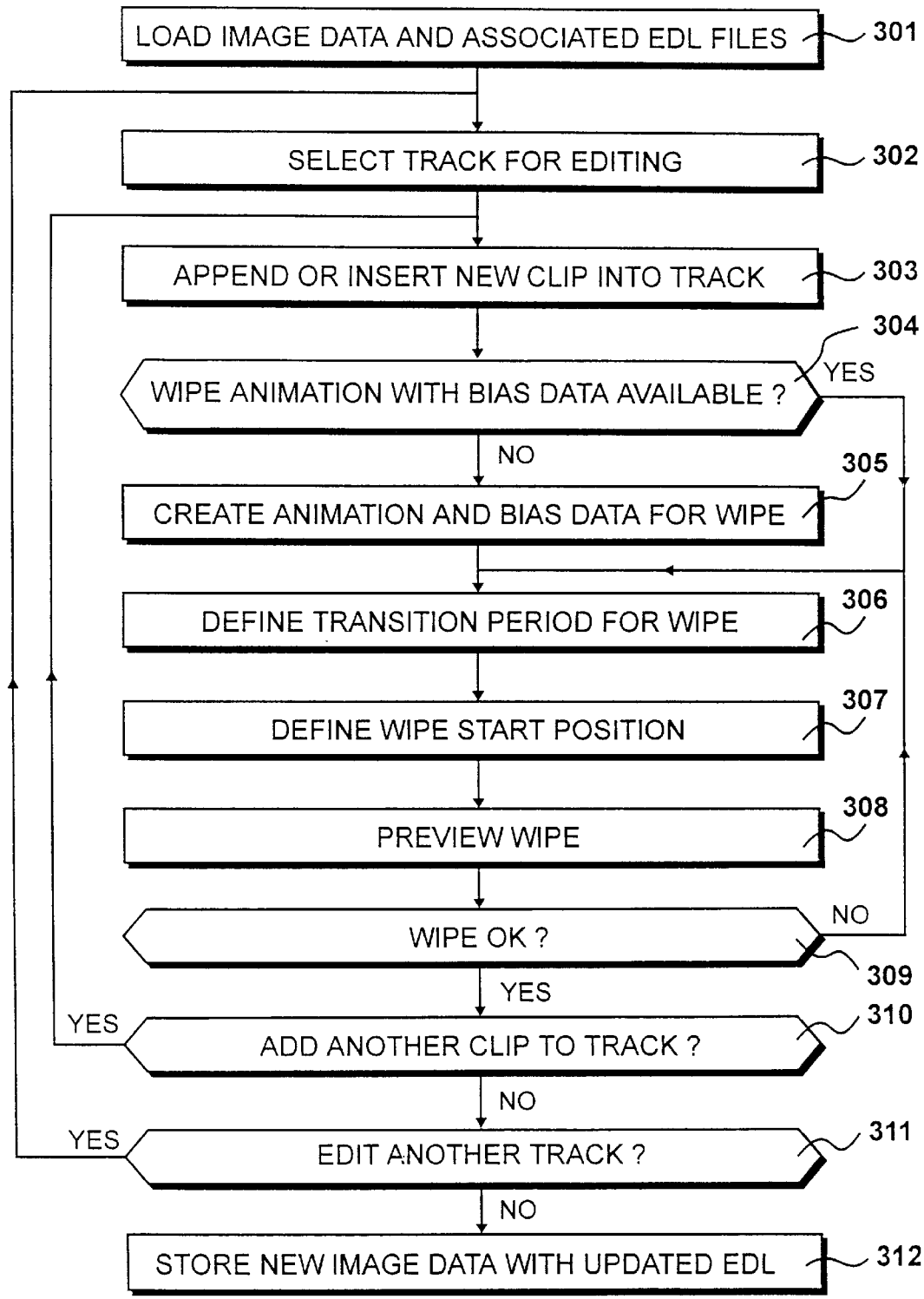
FIG. 3 identifies the steps performed by an editor where defining a wipe animation.

An overall procedure for generating a wipe is illustrated in FIG. 3. At step 301 image data and, if required, associated edit decision list files are loaded into the system. The image data is supplied to the image data store 102 and edit decision list files are held within internal storage of the main processing system 101.

At step 302 an editor selects a track for editing and at step 303 a new clip is appended or inserted into a processable image track.

At step 304 a question is asked as to whether a wipe animation with bias data is available and if answered in the negative, animation and bias data are created for the wipe at step 305. Alternatively, if answered in the affirmative, control is directed to step 306.

At step 306 a transition period for the wipe is defined and at step 307 a wipe start position is defined. At step 308 the wipe is previewed, thereby allowing an editor to confirm whether the desired result has been obtained. Thus, a question is asked at step 309 as to whether the wipe is correct and if answered in the negative, control is returned to step 306. Alternatively, if the desired wipe procedure has been defined, resulting in the question asked at step 309 being answered in the affirmative, control is directed to step 310.

At step 310 a question is asked as to whether another clip is to be added to the track and when answered in the affirmative, control is returned to step 303, whereupon the next clip is appended or inserted. Eventually, all of the clips will have been considered resulting in the question asked at step 310 being answered in the negative. At step 311 a question is asked as to whether another track is to be edited and when answered in the affirmative, control is returned to step 302. Eventually, all of the tracks will have been edited, the question asked at step 311 will have been answered in the negative and the new image data with an updated edit decision list (as appropriate) is stored at step 312.

Figure 4:
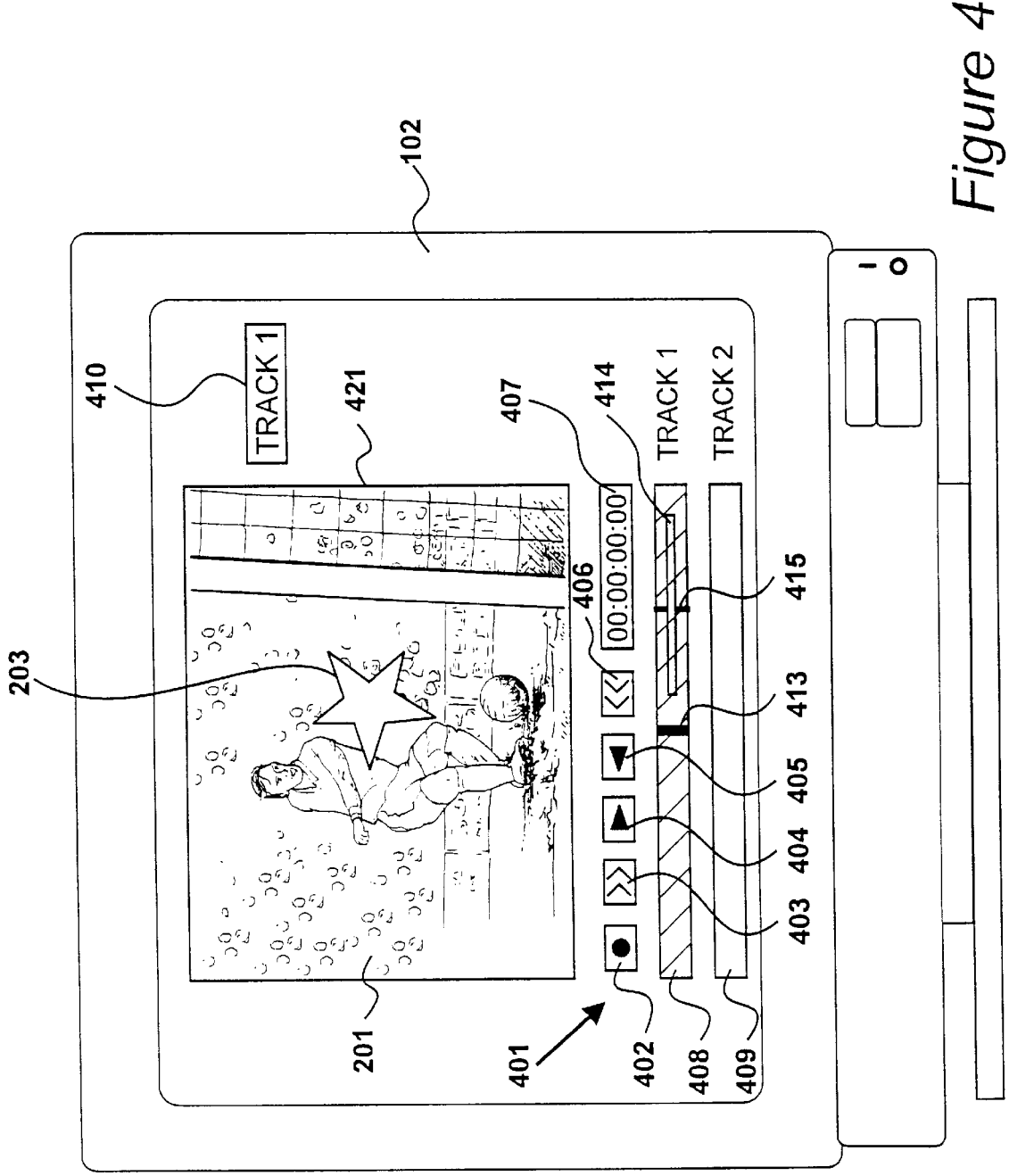
FIG. 4 illustrates a graphical interface displayed to an editor.

When performing editing operations upon image sequences, images displayed to an operator are modified from the type as shown in FIG. 2 to that shown in FIG. 4, whereupon a user interface 401 is displayed in addition to image frames. The interface includes a plurality of control buttons 402, 403, 404, 405 and 406, operatable in response to manual operation of stylus 106 as is known in the art. Button 402 stops the playing of a track, button 403 provides for the fast-forwarding of a track, button 404 provides for the playing of the track, button 405 provides for the swapping of the tracks to be displayed and button 406 provides for the rewinding of an image track. It should be noted that the editing system is actually of the "non-linear" type and the fast-forwarding and rewind buttons merely facilitate the provision of a familiar environment.

Window 407 displays time-code frame identifiers for a particular track, which may represent input data or output data as required. Graphical representations of the track sequences are also displayed at 408 and 409 for the first track and second track respectively. Track 408 is shaded in FIG. 4, representing a situation in which this track would be highlighted in the embodiment to indicate that this is the currently active track and that image frames from this track are presently being displayed within a frame image window 421. In addition, an identification of the current track being displayed is also made by means of a label window 410.

Track 401 includes a vertical indication 413 as to the current location of the track actually being displayed.

The presence of a wipe within track one is illustrated at 414 by means of a rectangular object placed within track 408. The notional position of a cut between tracks one and two is also indicated by a vertical line 415. The length and position of indication 414 may be modified by means of stylus 106, thereby controlling the nature of the wipe operation.

Figure 5A:
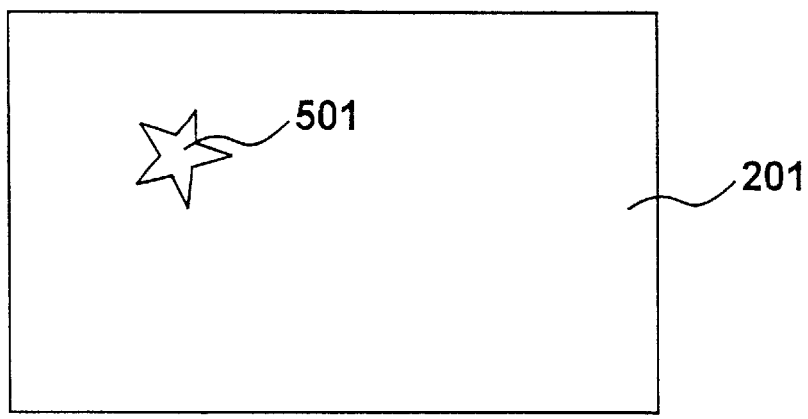
FIGS. 5A, 5B and 5C illustrate problems associated with moving the position of wipe animations.
Figure 5B:
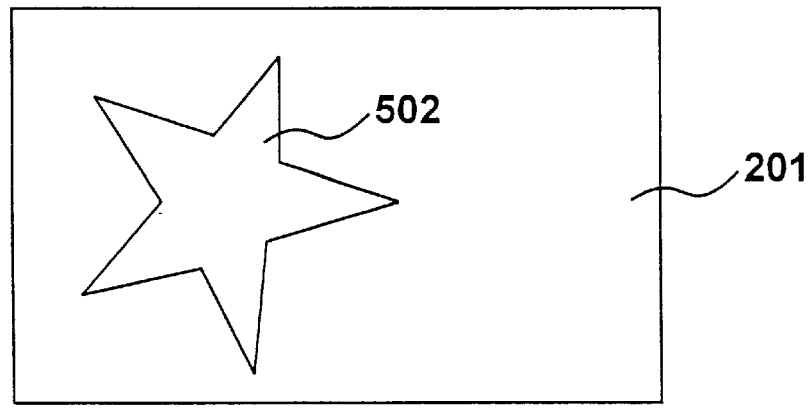
Figure 5C:
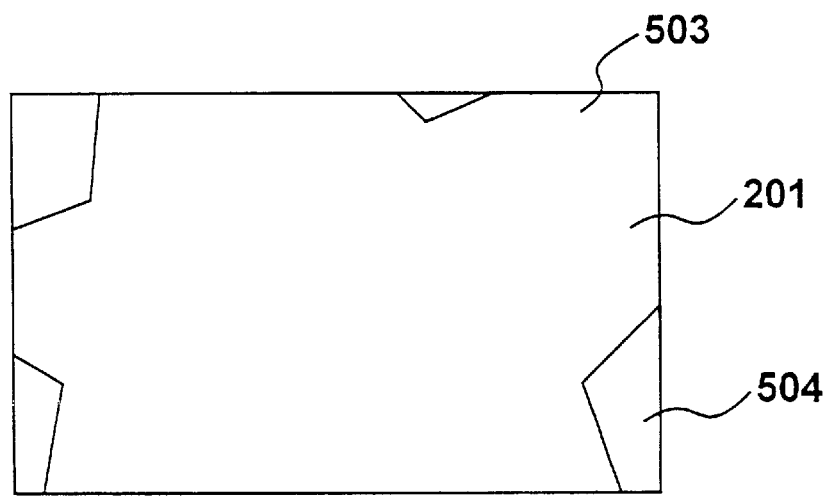

Shape boundary 501 is shown in FIG. 5A and the same boundary 502 is shown in FIG. 5B at a later point in time. Similarly, further expansion of the shape boundary 503 occurs as shown in FIG. 5C such that, ultimately, the whole of the image frame is taken up by the interior of the boundary shape. However, it is possible that FIG. 5C could represent the final frame of the wipe and from this it can be seen that not all portions of the image, such as portion 504, are placed internally within the boundary. This problem occurs particularly if the wipe has been calibrated with respect to a central starting position and thereafter the start position is moved within the image frame. Thus, it is a requirement that, irrespective of the wipe start position, the shape boundary should be expandable to an extent such that it effectively covers the entire area of the image display 201.

Figure 6:
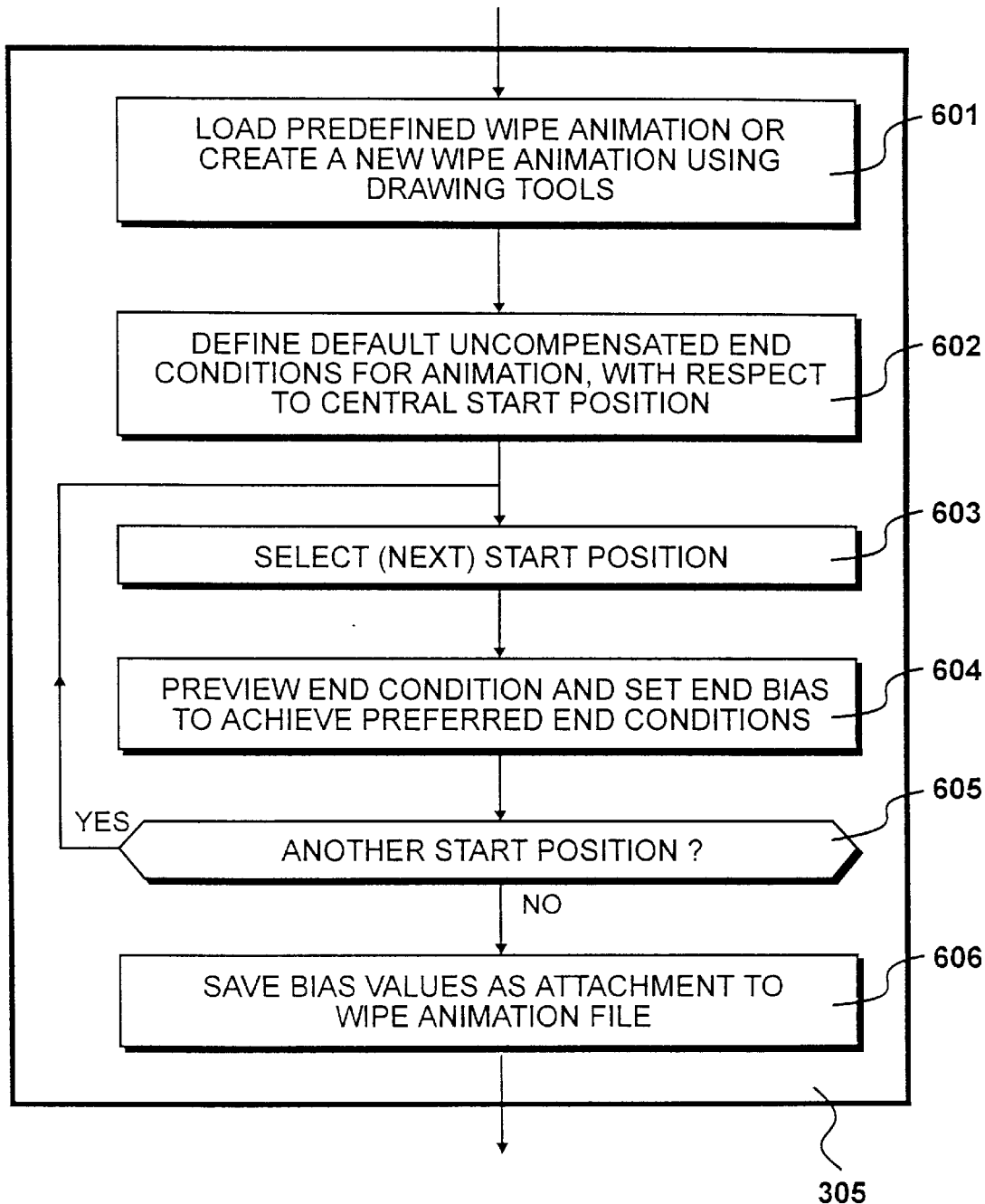
FIG. 6 further details steps for creating a wipe animation, including the step of selecting a start position.

Step 305 relating to the creation of a wipe animation is detailed in FIG. 6. At step 601 a predefined wipe animation is loaded or if an appropriate wipe animation is not available, an appropriate animation is created by the editor. Typically, a substantial library of predefined wipe animations are provided, each appropriate for a wipe initiated from a central starting position. Thus, for any wipe duration, animation parameters are generated such that the wipe completes from start to finish over the required number of frames. However, although such parameters will be appropriate for a wipe initiated at the central position of the frame, such parameters would not be appropriate for a wipe initiated from alternative locations. Consequently, position parameters are calculated for specific locations within the image frame, whereafter the rate of expansion of the wipe boundary is controlled with reference to an animation parameter and said animation parameter is derived by processing at least one of the stored position parameters with reference to a selected animation starting location.

After loading wipe animation data at steps 601, default uncompensated end conditions for the animation are defined at step 602 with respect to the central start position.

At step 603 a start position is selected whereafter at step 604 an end condition is previewed, thereby allowing end bias values to be set such that these achieve the preferred actual end condition for the application of the wipe process when initiated at the start position selected at step 603.

At step 605 a question is asked as to whether another start position is to be selected and when answered in the affirmative control is returned to step 603. This results in end bias conditions being defined for each of the predetermined start positions whereafter the question asked at step 605 is answered in the negative and bias values are saved as attachments to the wipe animation file at step 606.

Figure 7:
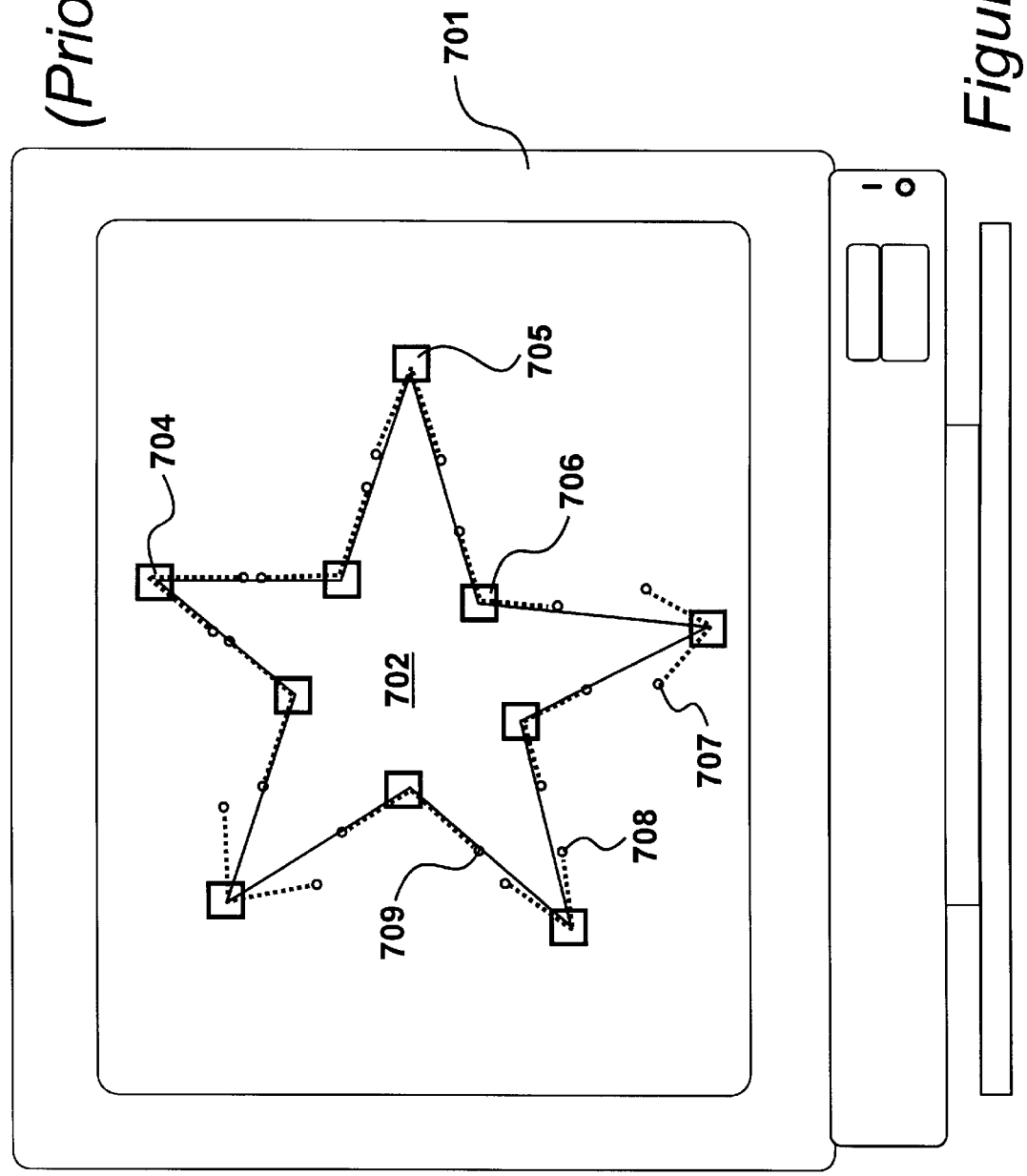
FIG. 7 illustrates a known process for drawing a wipe shape.

Wipe boundary shapes may be defined by a user, as illustrated in FIG. 7. An editing monitor 701 is configurable to display a graphical user interface associated with known drawing systems. A wipe boundary shape in the form of a star-shape is constructed in response to a graphical pointing device under the control of the user interface. This allows control boxes 704, 705, 706 etc to be defined, which are then moveable in response to the activation of drawing nodes 707, 708 and 709 etc. In this way, the shape boundary is defined by a plurality of vectors and the scaling of these vectors in order to generate the wipe animation is performed with respect to matrix manipulations as is well known in the art.

Figure 10:
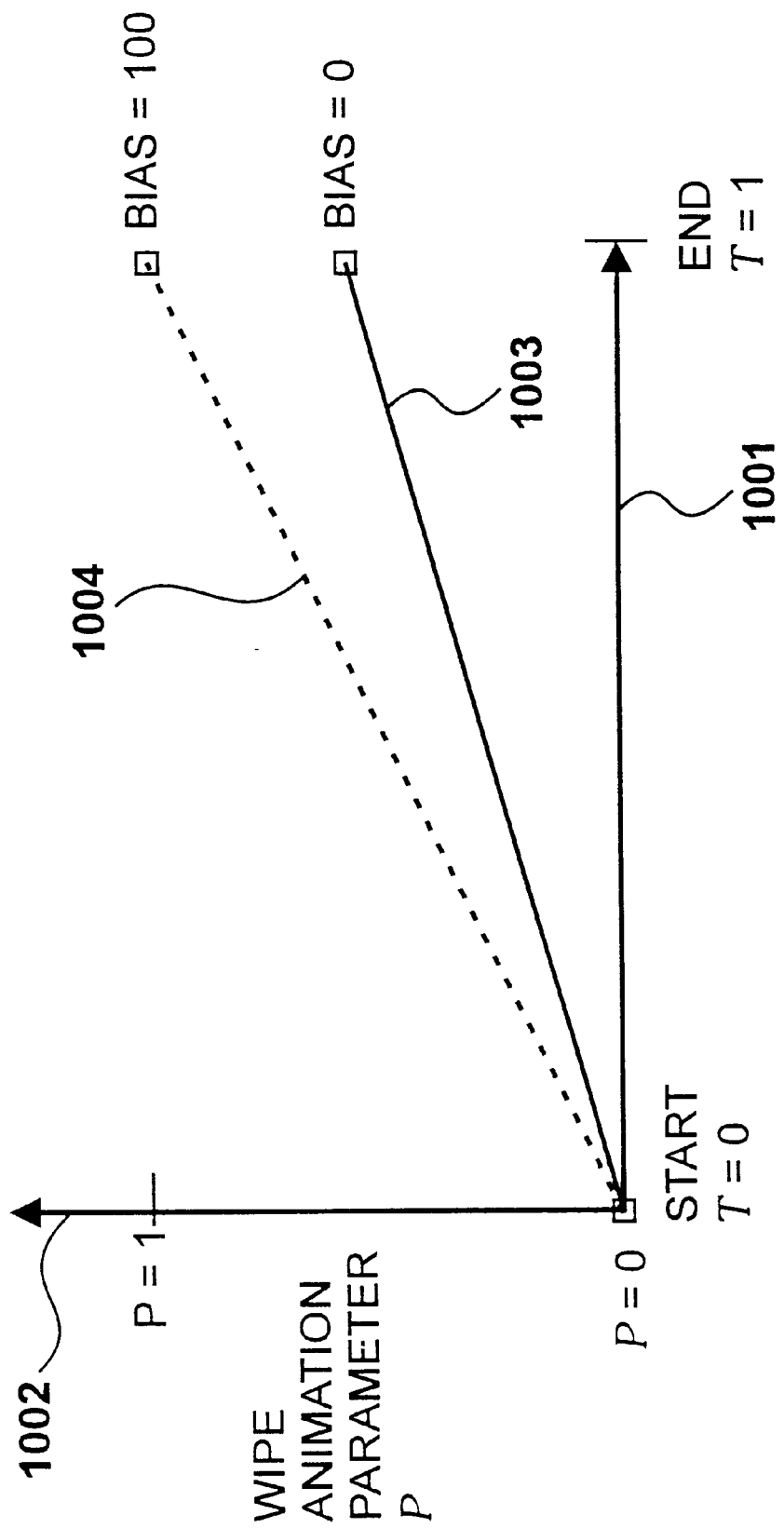
FIG. 10 illustrates a relationship between a time parameter T and a wipe animation parameter P.

The procedures described with respect to FIG. 7 allows a boundary shape to be defined, the size of which may be made variable with respect to an animation parameter. It is now necessary to scale the animation parameter, effectively defining a function showing how the wipe animation parameter varies with respect to time, as illustrated in FIG. 10.

Referring to FIG. 6, after obtaining the animation at step 601, it is necessary to define the default uncompensated end condition for the animation with respect to a central start position as required by step 602.

Figure 8:
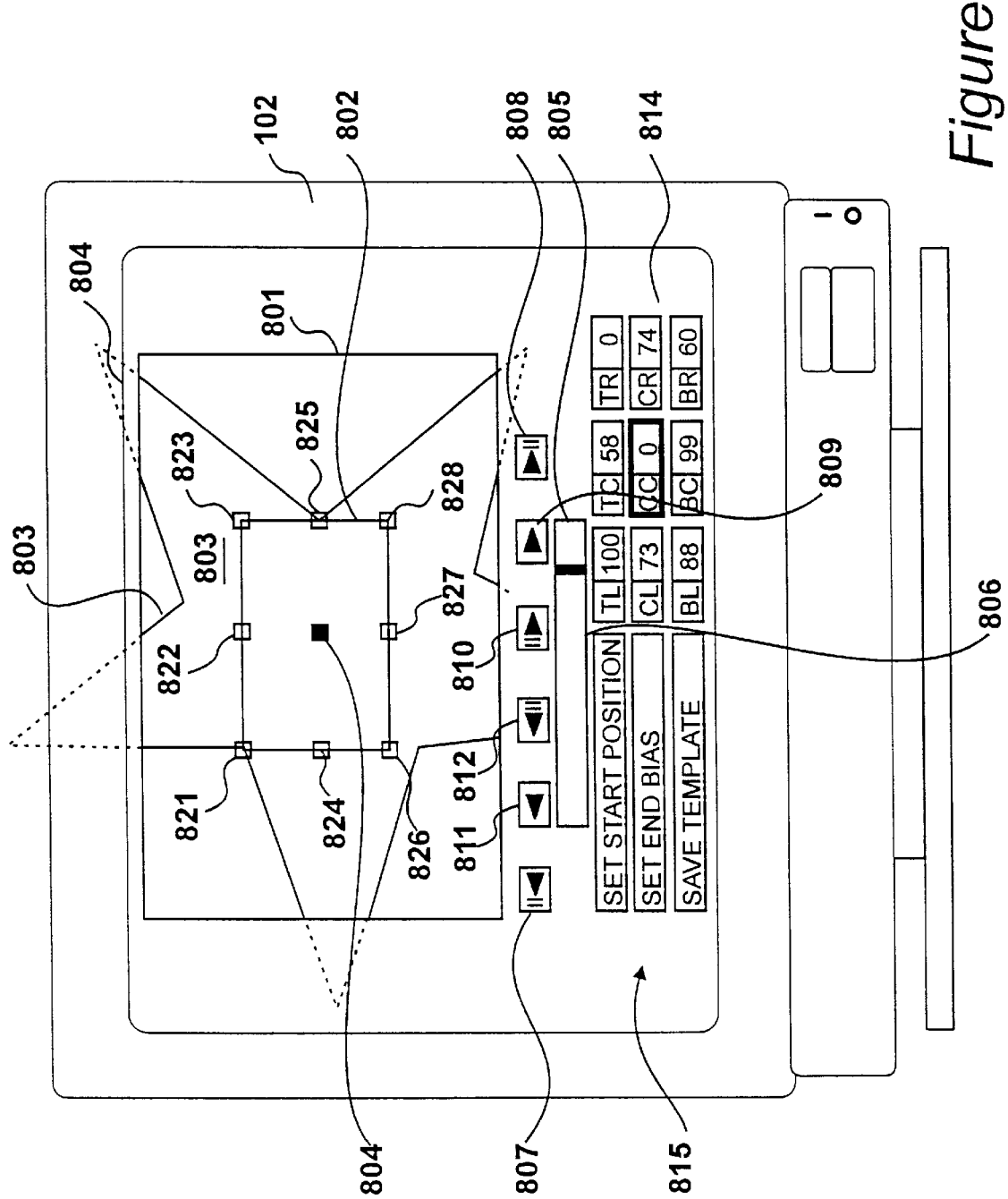
FIG. 8 illustrates a representation of an end condition that has resulted from initiating a wipe animation at the center of a displayed image.

On initiating this procedure, the user interface displayed to the editor is modified, as shown in FIG. 8. An image window 801 is displayed which represents a region identified by boundary 802 containing an output image frame but surrounded by additional non-visible space. In this way, an expanding wipe boundary, such as boundary 803, can be seen expanding beyond the boundary of the actual output image, thereby ensuring that the entirety of the output image is fully contained within the boundary when the wipe animation reaches its end.

The central start position for the wipe is indicated by location 804 and initially uncompensated end conditions are determined with respect to the wipe animation initiating from this central location. As the wipe animation is played, the wipe boundary 803 extends from an initial point at location 804 outwards until the whole region contained within boundary 802 falls within the wipe animation boundary. As the animation progresses an indicator line 805 traverses across an indication window 806. Activation of a button 807 causes the animation sequence to jump to the beginning with a similar button 808 causing the sequence to jump to its end. Button 809 selects normal play with button 810 selecting fast-forward. Similarly, button 811 selects reverse play with button 812 selecting fast rewind.

Below indication window 806 and to the right, there is a collection of nine buttons generally referenced 814. These are used to select particular starting position within the displayed image. In addition, below indication window 806 and to the left there are three function buttons used iteratively within the process defined by step 603 to 605.

In addition to being located at central position 804, position parameters are also determined for eight other starting positions, namely the top left position 821, the top centre position 822, the top right position 832, the center left position 824, the centre right position 825, the bottom left position 826, the bottom central position 827 and the bottom right position 828. This arrangement of starting positions corresponds to the arrangement of position selection buttons referenced generally at 814.

On initiating the procedure, central button, marked "CC" for centre-centre, of the group of buttons 814 is highlighted, indicated by the thickened borderline in FIG. 8. Operation of fast rewind button 807 ensures that the wipe animation is returned to its initial condition, representing a state in which an output image is derived exclusively from a first sequence of frames. Towards the bottom of the left of the screen three buttons generally references as 815 are present. A first allows a start position to be selected, a second sets an end position and a third is selected when a template is to be saved. After rewinding the wipe animation to its start position, the set start position button is operated, whereafter the animation is allowed to progress in its forward mode, by operation of button 809, until the animation covers the whole of the screen, as illustrated by shape 803. Having reached this position, the set end bias button is selected, representing the minimum animation parameter required in order to achieve a full wipe.

Figure 9:
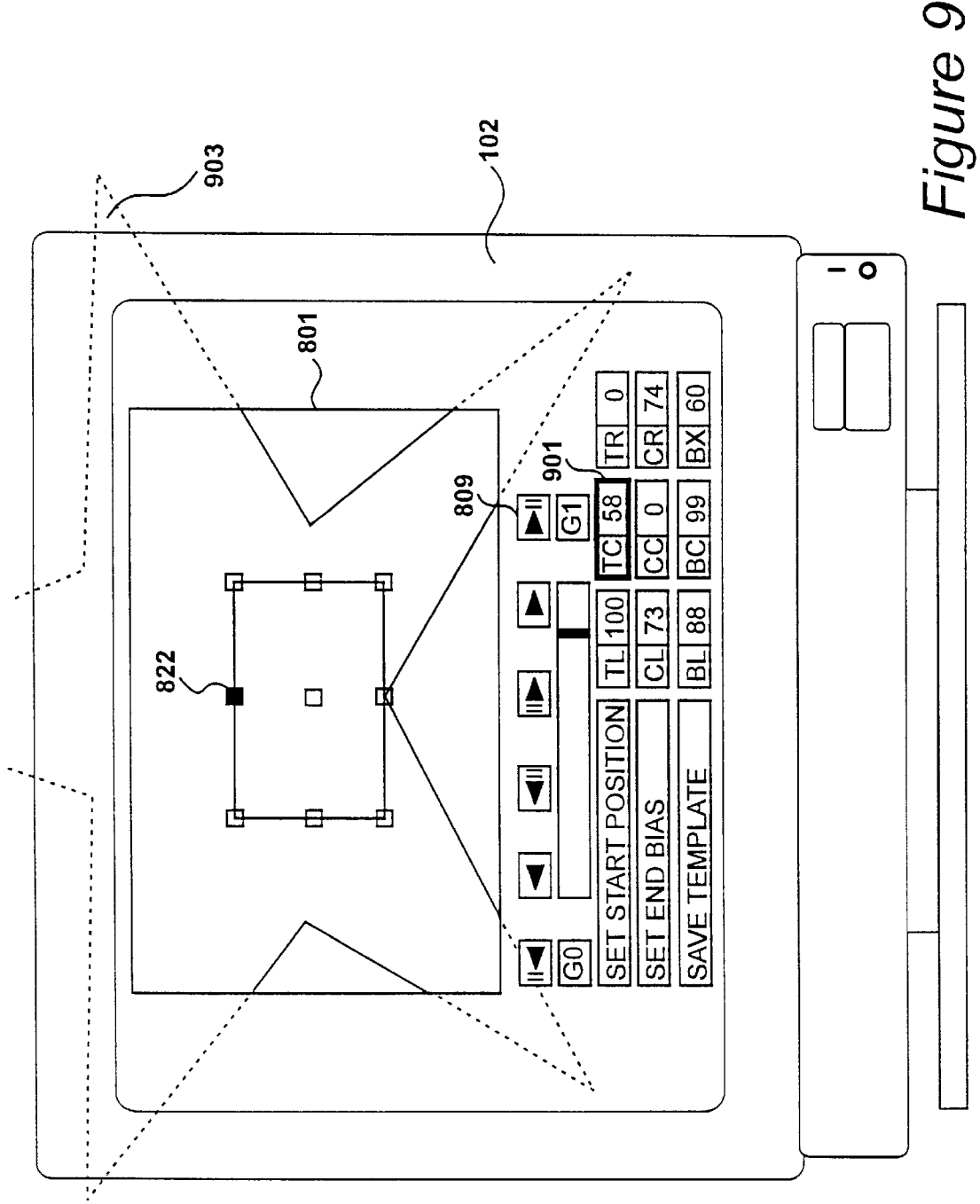
FIG. 9 illustrates a representation of the end condition resulting from initiating a wipe animation from a non-central position of a displayed image.

Having defined an end bias for the central location, the other buttons in arrangement 804 are selected sequentially, thereby setting bias conditions for the remaining positions. As illustrated in FIG. 9, the top central button may be selected next, resulting in this button becoming highlighted as shown at 901 at FIG. 9. Activation of button 809 now results in an expansion of the wipe animation from the top central location 822. Again, this animation is allowed to progress until it has fully extended beyond the extent of the screen, whereupon the set end bias button is operated. As can be seen from FIG. 9, the wipe animation, represented by outline 903, has been required to extend further than the previous iteration identified at 803 in FIG. 8. Thus, in this way, steps 603 to 605 are repeated until position parameters have been determined for all nine standard positions.

A linear relationship between a time parameter T and a wipe animation parameter P is shown in FIG. 10. Parameter T represents the time elapsed since the start of a given wipe animation expansion. Parameter T may adopt values from zero to one, therefore a value of T=0 represents the time of starting a particular expansion and a value of T=1 represents time that the expansion ceases. The wipe animation parameter P may take a variety of forms and is configured to determine the size of a wipe animation at any given time between the start (T=0) and the end (T=1) of the expansion.

A given wipe animation parameter P may be considered to consist of two-dimensions, namely a value (P) and a time (T). In the example shown, parameter P may take on values between zero and one and at T=0 the value of P is also set equal to zero. FIG. 10 therefore shows a wipe animation expansion plotted against time, consisting of a time axis 1001 and a wipe animation parameter axis 1002. A first relationship takes the form of a straight line 1003 which represents a wipe animation expansion against time with a bias value of zero. Similarly, a second wipe animation expansion against time relationship is shown by line 1004 which corresponds to the editor having specified a bias data value of one hundred. As shown in FIG. 10, the bias value effectively defines the extent of the wipe animation parameter at the end of the procedure, that is to say, when T is equal to one. In the linear relationship identified in FIG. 12, this may also be viewed as a scaling operation, increasing or decreasing the gradient of the relationship as required.

The exact values used for setting bias data values will depend upon the exact nature of the particular implementations. The bias data values themselves may be considered to modify given wipe animation expansion-time relationships in accordance with requirements specified by an editor upon previewing an initial wipe utilising a bias data value of zero. Relationships 1003 and 1004 in the example are both straight lines and therefore represent a constant rate of expansion of a given wipe animation. In the particular example shown, both relationships pass through the origin of axes 1001, 1002 and relationship 1003 terminates at T=1 with P=0.5. Similarly, relationship 1004 terminates with a wipe animation parameter value of T=1 and a P value equal to one. Thus, relationship 1004 represents a greater rate of expansion for a given wipe animation.

A particular selection of a bias data value is largely dependent upon the artistic judgement of an editor. Furthermore, the particular bias data value selected will depend upon the particular start position selected at step 603 in FIG. 4. Thus a start position located nearer to an edge of the image display portion of display monitor 102 will in general require a greater bias data value than a more centrally located start position. In particular, a start position located towards the edge of a given image display portion will require a maximum amount of expansion to be effected.

Figure 11:
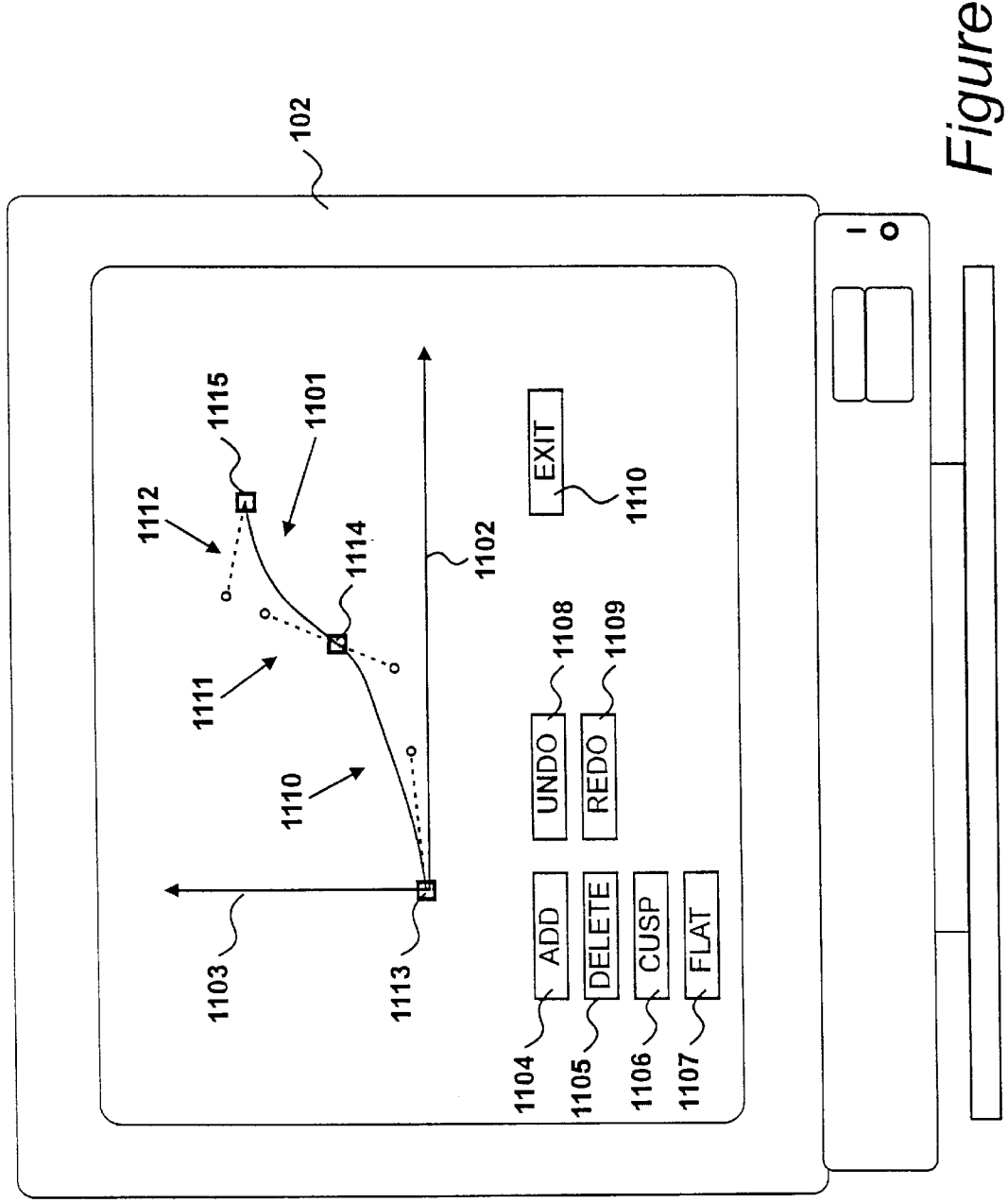
FIG. 11 illustrates a more complex relationship with time parameter T and wipe animation parameter P.

An expansion-time relationship displayed on the screen of monitor 102 is shown in FIG. 11, configured such that an editor may directly modify or create a bespoke graphical relationship as required. To modify or create such a graphical relationship, the editor may interact with the displayed graphical relationship 1101, having a horizontal time axis 1102 and a vertical wipe animation parameter axis 1103, by means of the stylus 106 and touch tablet 107 combination shown in FIG. 1. Having selected this mode of operation, button 1104 "ADD" is configured to add a new relationship to be stored by processing system 101. Button 1105 "DELETE" is configured to delete a given relationship or simply to delete a portion of a given relationship currently being constructed by the editor. Button 1106 "CUSP" is configured to enable the editor to adjust the end point of a given relationship 1101. Button 1107 "FLAT" is configured to flatten a given relationship in response to incremental operation of the button. Button 1108 "UNDO" is configured to reverse a modification made to relationship 1101 and, similarly, button 1109 "REDO" is configured to enable the editor to establish modification to relationship 1101, previously undone. Button 1109 "EXIT" allows the editor to return to a previous interface after the modifying or creating operations have been completed.

Relationship 1101, as shown in the example of FIG. 11, may take on a more complex relationship compared to the purely linear relationship identified in FIG. 10. The illustrated example consists of a curve having a left portion 1110 of relatively low gradient, a central portion 1111 of a more substantial gradient and a right portion 1112 having a lower gradient than that of the central portion. The relationship may be created using standard mathematical graphics-based tools, configured to enable curves of this type, to be established in a relatively simple way. Thus, for example, the editor may select three points such as point 1113 that is the origin of axes 1101 and 1103, point 1114 and point 1115 at the top-right side. Thereafter, a relationship may be established between these three points as required.

The relationship identified in FIG. 11 may be interpreted as comprising a relatively low expansion rate (portion 1110) followed by a greater expansion rate (portion 1111) which then reduces again to a lower expansion rate (portion 1112).

Figure 12:
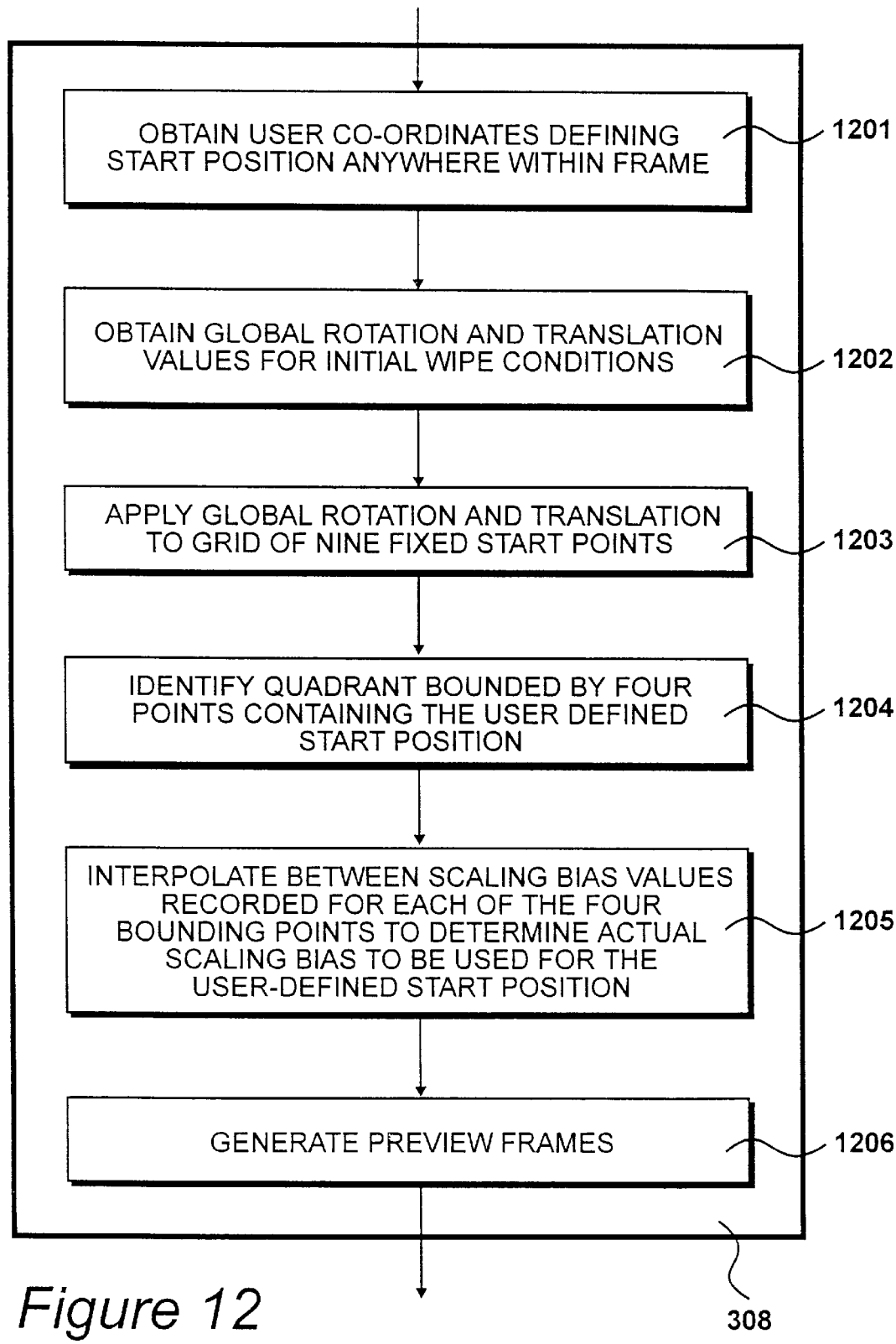
FIG. 12 details the preview wipe step identified in FIG. 3, including a step for generating preview frames.

FIG. 12 details steps performed by an editor 101 upon having defined and performed a wipe animation in order to effect the replacement of a first image clip by a second image clip and the steps represent an expansion of the "preview wipe" step identified in FIG. 3. At step 1201 the processing system obtains editor defined coordinates specifying the editor's desired starting position anywhere within a current frame being displayed. Following step 1201, at step 1202, device 104 obtains editor specified global rotation and translation values are defined; effectively set by the editor as an initial wipe animation condition. Thus steps 1201 and 1202 may be considered to comprise moving editor defined location data from one memory location to another and these selections made by the editor may be mobilized by transferring them for actual use in processing by device 104. Following step 1202, at step 1203 the processing system is configured to apply the global rotation and translation values to the grid of nine standard fixed start positions.

Following step 1203, at step 1204 the processing system is configured to identify a quadrant bounded by four of the standard points containing the user defined start position. Step 1204 effectively applies to starting points selected by the editor which are points other than any of the nine standard points. Following step 1204, at step 1205 the processing system is configured to interpolate between the bias data values set and stored (at step 305 illustrated in FIG. 6) for each of the four bounding standard positions. Interpolating between the bias data values for the four bounding positions enables the processing system to determine a scaled (derived) bias data value to be used for the actual user defined start position defined at step 1201. Thus the nine UBV's may be considered to constitute seed values from which DBV's can be obtained by interpolation for any arbitrarily chosen user defined start position or transformation of the associated wipe animation. Following step 1205, preview frames for a given selected start position are generated as indicated at step 1206. In the case of a given start position being selected at step 1201 from one of the nine standard start positions then steps 1204 and 1205 are suitably configured to be effectively bypassed. Similarly, should an editor not require rotational and/or translational motion of a wipe animation, steps 1202 and 1203 may be configured to be bypassed. With respect to step 1205, interpolation is best affected as a slightly nonlinear interpolation, this being preferable to avoid a slight expansion effect which is present towards the central area of the standard nine point grid.

Thus the invention may be considered to comprise a method and apparatus to facilitate an editor to modify the originally specified starting conditions of a given wipe animation (by translating it in two dimensional space) whereafter automatic adjustment of the associated animation is effected such that the wipe still obeys certain user specified constraints (i.e. typically that the wipe animation correctly fills the screen at the end of the animation).

Figure 13A:
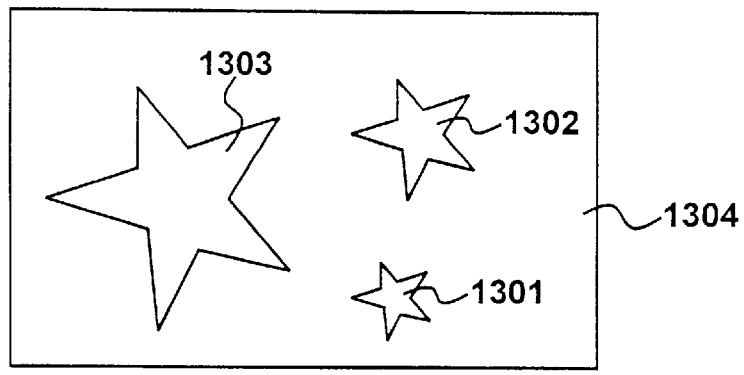
FIGS. 13A, 13B and 13C illustrate complex wipe animation sequences including a rotational component.
Figure 13B:
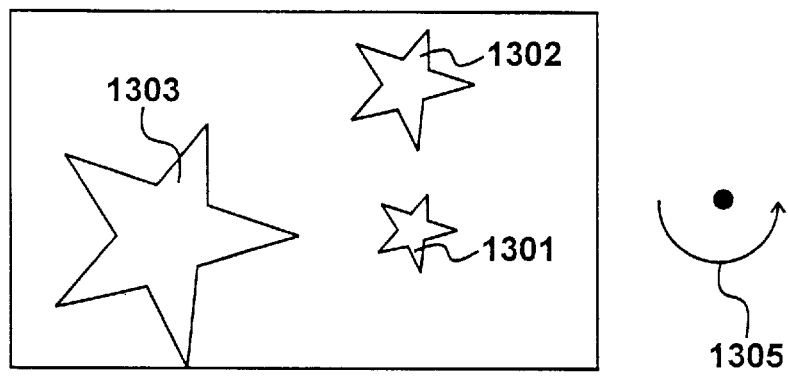
Figure 13C:
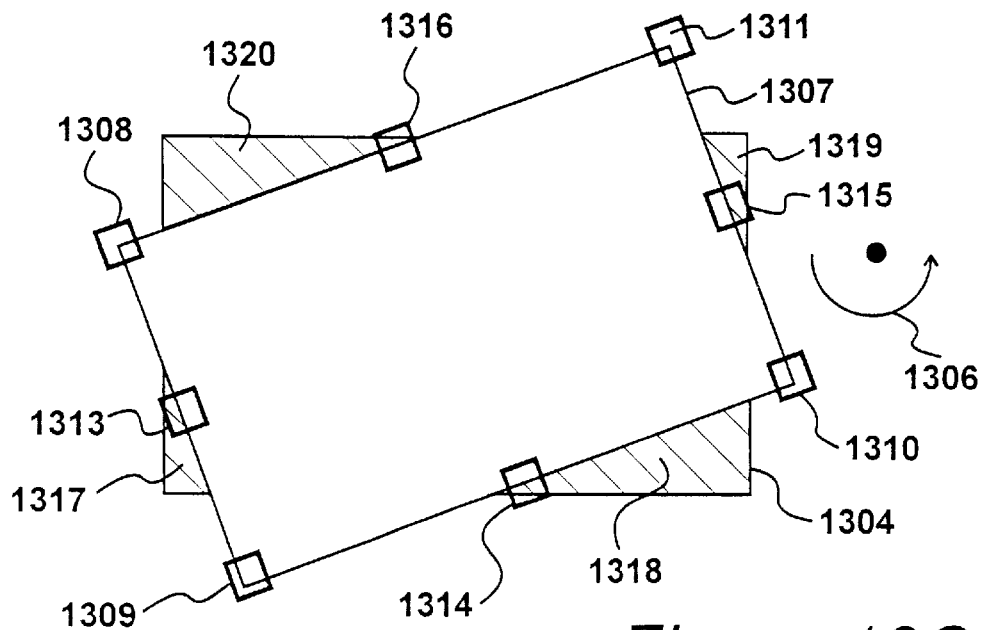

As indicated above, an editor may desire to utilize a more complex wipe animation arrangement wherein for example a given expanding wipe animation may be configured to comprise a plurality of expanding shapes and/or comprise one or more rotating shapes. FIGS. 13(A) to 13(C) schematically illustrate, in succession, a more complex wipe animation sequence of this type. FIG. 13(A) illustrates a wipe animation image replacement entity comprising a plurality of star-shaped wipe animation elements, 1301, 1302 and 1303 respectively. The wipe animation elements are illustrated upon an image display portion 1304 of an editing monitor of the type identified in FIG. 1. The wipe animation arrangement illustrated in FIG. 13(A) additionally comprises a rotational component and a short time later the respective positions of elements 1301, 1302 and 1303 move in relation to image display portion 1304. FIG. 13(B) illustrate the wipe animation arrangement identified in FIG. 13(A) a short time later wherein a rotational movement indicated at 1305 as being counter-clockwise has been effected, such that element 1303 has been displaced in a downwards direction to the right, element 1301 has been displaced in an upwards direction to the right and element 1302 has been displaced in an upwards direction to the left.

When a rotation of the type identified in FIGS. 13(A) and 13(B) has been performed, the set (i.e. a grid) of associated bias data values is also effectively rotated as indicated in FIG. 13(C). The rotation indicated at 1305 is again indicated at 1306 in relation to the grid of bias data values schematically illustrated at 1307. In FIG. 13(C), the grid of bias data values associated with the nine standard points is rotated in relation to the image display portion 1304, locating the corner points comprising points, 1308 to 1311, outside of the image display portion 1304. However, the bias data values associated with the central standard point 1302 and the mid points 1313 to 1316 respectively remain within the bounds (in the particular example illustrated of a partial rotation identified as having occurred between FIG. 13(A) and FIG. 13(B)) of image display portion 1304.

A bias data value set for an arbitrarily chosen point is configured to take into account a rotation of the selected point in two dimensional space. Thus to effect a rotation, bias data values associated with either the standard points or arbitrarily chosen points must be modified. As is known in the art of effecting rotation in a computer graphics environment, modifications to data undergoing a rotation of this type may be achieved through use of a suitable rotation matrix. However, the embodiment is not restricted to complex wipe animations comprising only rotational components or a plurality of wipe animation elements or a plurality of rotating elements. It is possible that the editor may require a given wipe animation to undergo a global translation and again such a translation will necessitate modifications to editor defined bias data values via a suitably configured translation matrix.

The rotation of the standard start positions identified in FIG. 13(C) results in corner regions 1317 to 1320 of image display portion 1304 for which interpolation (performed at step 1205 in FIG. 12) between bias data values associated with four of the standard points does not give an interpolated bias data value. In FIG. 13(C), image display portions 1317 to 1320, each lying outside the grid of rotated bias data values, may be used for defining suitable start points if the processing system is configured in a manner to effect a more complicated interpolation and/or extrapolation procedure. Thus, for example, the processing system may be configured to place a few extra points outside the grid of standard points in order to enable an interpolation to be performed in corner regions 1317 to 1320 after a particular rotation has been applied.

Figure 14:
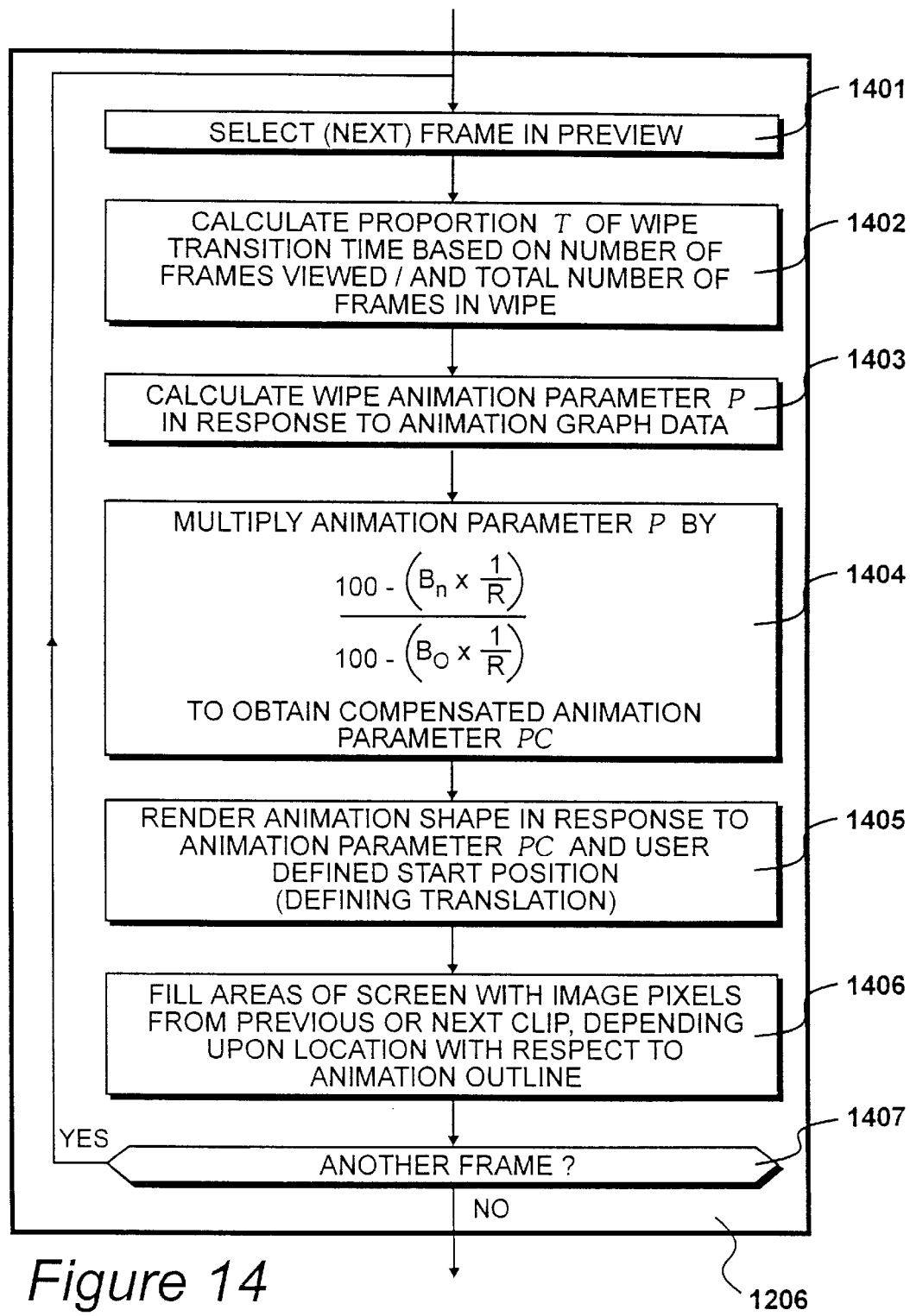
FIG. 14 details the step of generating preview frames identified in FIG. 12.

FIG. 14 details the steps comprising step 1206 "Generate Preview Frames" identified in FIG. 12 and relates to effecting a given editor specified wipe animation so that the wipe animation may be previewed by the editor. Thus for a given displayed first image clip which is to be replaced by a second image clip, image frame data of the first image clip is selected by the processing system at step 1401. Following selection at step 1401, if the frame selected is not the first frame of the clip, the processing system is configured to calculate the proportion of time that has elapsed since the first image of the clip was effected to start. A proportion of time may be calculated by dividing the number of frames viewed by the total number of frames to be passed through during a particular image wipe. Following step 1402, at step 1403 the processing system is configured to calculate a wipe animation parameter P of the kind identified in FIG. 10 and thus the required wipe animation parameter P is calculated in response to editor defined animation graph data of the type detailed in FIGS. 10 and 11. Following step 1403, at step 1404 the given wipe animation parameter (P) is modified by application of a multiplier f. The factor f is calculated from the following equation:

$$f = (100 - (B_n * 1/R))/(100 - (B_o * 1/R))$$

where:

$B_o$ is the previously applied bias data value i.e. it is the result of interpolating between bias data values associated with the standard start positions;

$B_n$ is the new bias data value to be applied i.e. it is a correction applied when the editor requires the interpolation to be modified; and R is the ratio of the maximum area to be covered by the wipe animation to the minimum area to be covered.

The editor is free to move a start position of a given wipe to be performed to any position on the screen and, in addition, is free to rotate the wipe animation at its start point any arbitrary number of degrees. Provision of this facility demands that the appropriate DBV associated with a given start point must be compensated so as to render it suitable for the particular transformation selected by the editor. A single dbv (labeled dbv 1 for example) is calculated and it is used for the value of the new bias data value ($B_n$) in the above formula for f. At this point, the associated wipe animation can be scaled correctly and the wipe previewed as indicated at step 308 in FIG. 3. However, if after previewing a resulting wipe animation, the editor is not satisfied with the wipe effected in accordance with the transformations selected at steps 306, 307 (and obtained in 1202), the editor may make a new choice wherein another dbv is calculated (dbv 2) based on the new transformations applied. Thus in effect control is directed from step 309 to 306 whereafter previous selections made at step 306 and 307 may be reused by the repeated sub-steps, steps 1201–1206, of step 308. If the Editor does require to redefine the values obtained in step 1202, dbv2 would be the new bias data value ($B_n$) and dbv1 would be the old bias data value $B_o$. Thus the most recent values for $B_o$ and $B_n$ may be utilized in step 1206 and a new f value calculated in accordance with the equation for f identified in step 1404 of FIG. 14. Thus, whenever an editor adjusts the wipe starting conditions at steps 306 and 307 (including the transformation parameters comprising for example global rotation and translation values to be obtained at step 1202) an appropriate dbv is calculated.

In certain applications, the value of R may be conveniently hard coded. Thus for example the value of R may be set to the value two. An R value of two represents the maximum area that a wipe animation would have to traverse in the worst case; the worst case being where the wipe animation is initiated from the position located at the edge of the screen thereby necessitating expansion in a direction towards the opposite edge of the screen and in the opposite direction. Restricting R to the value two simplifies the above formula for the factor f to give:

$$f=(100-0.5B_n)/(100-0.5B_o)$$

The factor f calculated as described is then used to scale an animation parameter P in its entirety such that existing values for P are moved in time to correspond to a new starting point and orientation for the geometry being animated. Thus, the present embodiment does not generate new values for P, but makes existing values occur sooner (or later) in time. The relationship between the new bias data value $B_n$ and the old bias data value $B_o$ is important because it allows a series of bias data values to be applied correctly in response to a series of transformations applied by the editor to the wipe animation shape.

Following multiplication of the wipe animation parameter P by multiplier f a modified wipe animation parameter is derived, referred to as a compensated wipe animation parameter (PC). Assuming a new bias data value $B_n$=100 and $B_o$=0 then, from the formula for f identified in step 1404 with R=2, a value of f=0.5 is obtained. Thus applying f=0.5 to a value for P that was occurring at time t effectively forces P (now the compensated wipe animation parameter, PC) to occur at (t*0.5). Thus if P is the scaling quantity and the wipe animation is expanding to fill the screen, the expansion rate of the wipe animation is effectively doubled for bias data comprising $B_n$=100 and $B_o$=0. Following step 1404 processing device 104 is configured to render the wipe animation shape in response to the compensated animation parameter (PC) and the user defined start position, thus defining the required translational expansion of the wipe animation shape. Following step 1405, at step 1406 processing device 104 is configured to fill areas of the image display portion of monitor 102 with image pixels from the second image clip, the second image pixels, in the preferred embodiment, being present within the boundary of a particular wipe animation shape being employed. Thus at this point the editor previews the wipe. Following step 1406 processing device 104 is configured to respond to a question at step 1407 as to whether there is another image frame within the first image clip to be processed. If this question is answered in the affirmative, to the effect that there is a further image frame within the first image clip to be processed, control is returned to step 1401. However, if the question asked at step 1407 is answered in the negative to the effect that all the image frames comprising the first image clip have been processed, control is passed to step 309 in FIG. 3 wherein an editor is required to judge whether the particular wipe (image replacement) performed is sufficient for the required purpose.

What is claimed is:

1. Image data editing apparatus configured to produce a sequence of output image frames, including image storage means for storing a first input sequence of image frames and a second input sequence of image frames;

data storage means for storing a plurality of position parameters in which each of said position parameters relates to a specific location within an image frame;

processing means configured to generate a wipe animation over a sequence of output frames such that an increasing proportion of the output image is derived from said second sequence and a decreasing proportion of the output image is derived from said first sequence, under the control of a moving boundary defined by a wipe animation, wherein the rate of expansion of said boundary is controlled with reference to an animation parameter; and said animation parameter is derived by processing at least one of said stored position parameters with reference to a selected animation starting location.

2. Apparatus according to claim 1, wherein said data storage means is configured to store a plurality of position parameters relating to specific positions within an image frame, wherein said specific positions are predefined such that similar positions are adopted for each of a plurality of wipe animations.

3. Apparatus according to claim 2, wherein said image storage means is configured such that position parameters are stored for nine locations.

4. Apparatus according to claim 3, wherein said image storage means are configured such that position parameters are stored for positions at the top-left, top-centre, top-right, left-centre, central-centre, right-centre, bottom-left, bottom-centre and right-centre, with reference to a viewing screen.

5. Apparatus according to claim 2, wherein said processing means is configured to facilitate the definition of position parameters by the previewing of a wipe and the manual setting of minimum values for achieving full wipes at each of said specific positions.

6. Apparatus according to claim 1, wherein said processing means is configured to perform a wipe animation defining a shape rotation and/or a shape translation.

7. Apparatus according to claim 2, wherein a wipe is initiated from a position displaced from one of said specified positions and said processing means is configured to produce said animation parameter by processing a plurality of said position parameters.

8. Apparatus according to claim 7, wherein said processing means is configured to produce said animation parameter by a process of interpolation.

9. Apparatus according to claim 1, wherein a wipe is initiated from a position outside a notional viewing area.

10. Apparatus according to claim 9, wherein said processing means is configured to generate said wipe animation parameter by a process of extrapolation.

11. A method of editing image data to produce a sequence of output image frames, in which a first input sequence of image frames and a second input sequence of image frames are stored in image storage means, a plurality of position parameters relating to specific locations within an image frame are stored in data storage means, and processing means are configured to perform the steps of:

generating a wipe animation over a sequence of output frames such that an increasing proportion of the output image is derived from said second sequence and a decreasing proportion of the output image is derived from said first sequence, under the control of a moving boundary defined by a wipe animation;

controlling the rate of expansion of said boundary with reference to an animation parameter; and deriving said animation parameter by processing at least one of said stored position parameters with reference to a selected animation starting location.

12. A method according to claim 11, wherein a plurality of position parameters are stored relating to specific positions within an image frame, wherein said specific positions are predefined such that similar positions are adopted for each of a plurality of wipe animations.

13. A method according to claim 12, wherein position parameters are stored for nine locations.

14. A method according to claim 13, wherein position parameters are stored for positions at the top-left, top-centre, top-right, left-centre, central-centre, right-centre, bottom-left, bottom-centre and right-centre, with reference to a viewing screen.

15. A method according to claim 12, wherein the definition of position parameters is facilitated by the previewing of a wipe and a manual setting of minimum values for achieving full wipes at each of said specific positions.

16. A method according to claim 11, wherein a wipe animation defines a shape rotation and/or a shape translation.

17. A method according to claim 12, wherein a wipe is initiated from a position displaced from one of the specific positions and said animation parameter is produced by processing a plurality of said position parameters.

18. A method according to claim 17, wherein said animation parameter is produced by a process of interpolation.

19. A method according to claim 11, wherein a wipe is initiated from a position outside a notional viewing area.

20. A method according to claim 19, wherein said wipe animation parameter is generated by a process of extrapolation.

21. A computer system programmed to:

(a) generate a wipe animation over a sequence of output frames such that an increasing proportion of an output image is derived from a second sequence of stored frames and a decreasing proportion of said output image is derived from a first stored sequence of image frames, under the control of a moving boundary defined by a wipe animation;

(b) control the rate of expansion of said boundary with reference to animation parameter; and (c) derive said animation parameter by processing at least one of said stored position parameters with reference to a selected animation starting location.

22. A computer system programmed according to claim 21, further programmed to store a plurality of position parameters relating to specific positions within an image frame and to select one of said specific positions such that similar positions are adopted for each of a plurality of wipe animations.

23. A computer system programmed according to claim 22, further programmed to store position parameters at nine locations.

24. A computer system programmed according to claim 23, further programmed to store position parameters at the top-left, top-centre, top-right, left-centre, central-centre, right-centre, bottom-left, bottom-centre and right-centre, with reference to a viewing screen.

25. A computer system programmed according to claim 22, further programmed to facilitate the previewing of a wipe and the manual setting of mininimum values for achieving full wipes at each of said specific positions.

26. A computer system programmed according to claim 21, further programmed to perform a wipe animation defining a shape rotation and/or a shape translation.

27. A computer system programmed according to claim 22, further programmed to initiate a wipe from a position displaced from one of said specified positions and to produce an animation parameter by processing a plurality of said position parameters.

28. A computer system programmed according to claim 27, further programmed to produce said animation parameter by a process of interpolation.

29. A computer system programmed according to claim 21, further programmed to facilitate the initiation of a wipe from a position outside a notional viewing area.

30. A computer system programmed according to claim 29, further programmed to generate said wipe animation parameter by a process of extrapolation.

31. A computer-readable medium having computer-readable instructions executable by a computer, such that said computer performs the steps of:

(a) producing a sequence of output image frames, with reference to image storage means for storing a first input sequence of image frames and a second input sequence of image frames and with reference to data storage means for storing a plurality of position parameters in which each of said position parameters relates to a specific location within an image frame; and (b) generating a wipe animation over a sequence of output frames such that an increasing proportion of the output image is derived from said second sequence and a decrease in proportion of the output image is derived from said first sequence, under the control of a moving boundary defined by a wipe animation, wherein the rate of expansion of said boundary is controlled with reference to an animation parameter and said animation parameter is derived by processing at least one of said stored position parameters with reference to a selected animation starting location.

32. A computer-readable medium according to claim 31, having computer-readable instructions executable by a computer, such that said computer performs the further steps of:

storing a plurality of position parameters relating to specific positions within an image frame, wherein said specific positions are predefined such that similar positions are adopted for each of a plurality of wipe animations.

33. A computer-readable medium according to claim 32, having computer-readable instructions executable by a computer, such that said computer performs the further step of storing nine position parameters relating to respective locations.

34. A computer-readable medium according to claim 33, having computer-readable instructions executable by a computer, such that said computer performs a further step of storing position parameters for positions at the top-left, top-centre, top-right, left-centre, central-centre, right-centre, bottom-left, bottom-centre and right-centre, with reference to a viewing screen.

35. A computer-readable medium according to claim 32, having computer readable instructions executable by a computer, such that said computer performs a further step of:

facilitating the definition of position parameters by supplying data to a display device to allow the previewing of a wipe in addition to providing a user interface to facilitate the manual setting of minimum values for achieving full wipes at each of said specific positions.

36. A computer-readable medium according to claim 31, having computer-readable instructions executable by a computer, such that said computer performs the further step of performing a wipe animation defining a shape rotation and/or shape translation.

37. A computer-readable medium according to claim 32, having computer-readable instructions executable by a computer, such that said computer performs the further step of producing a wipe animation parameter by processing a plurality of position parameters, to allow a wipe to be initiated from a position displaced from one of said specified positions.

38. A computer-readable medium according to claim 37, having computer-readable instructions executed by a computer, such that said computer performs a further step of producing said animation parameter by a process of interpolation.

39. A computer-readable medium according to claim 31, having computer-readable instructions executable by a computer, such that said computer performs the further step of initiating a wipe from a position outside of a notional viewing area.

40. A computer-readable medium according to claim 31, having computer-readable instructions executable by a computer, such that said computer performs a further step of generating said wipe animation parameter by a process of extrapolation.

* * * * *

UNITED STATES PATENT AND TRADEMARK OFFICE
CERTIFICATE OF CORRECTION

PATENT NO. : 6,366,286 B1
DATED : April 2, 2002
INVENTOR(S) : David W. Hermanson It is certified that error appears in the above-identified patent and that said Letters Patent is hereby corrected as shown below:

<u>Title page,</u>
Item [56], U.S. PATENT DOCUMENTS, insert the following references after "5,515,110 A 05/1996 Alig et al."

| | | |
|---|---|---|
| -- 5,191,645 | 03/1993 | Carlucci et al. |
| 5,237,648 | 08/1993 | Mills et al. |
| 5,339,393 | 08/1994 | Duffy et al. |
| 5,353,391 | 10/1994 | Cohen et al. |
| 5,359,712 | 10/1994 | Cohen et al. |
| 5,388,197 | 02/1995 | Rayner |
| 5,404,316 | 04/1995 | Klinger et al. |
| 5,442,744 | 08/1995 | Piech et al. |
| 5,488,433 | 01/1996 | Washino et al. |
| 5,568,275 | 10/1996 | Norton et al. |
| 5,758,180 | 05/1998 | Duffy et al. |
| 5,760,767 | 06/1998 | Shore et al. |
| 5,781,188 | 07/1998 | Amiot et al. |
| 5,786,814 | 07/1998 | Moran et al. |
| 5,926,603 | 07/1999 | Tanaka et al. |
| 5,930,445 | 07/1999 | Peters et al. |
| 5,982,364 | 11/1999 | Beckwith |
| 5,999,173 | 12/1999 | Ubillos |
| 6,016,380 | 01/2000 | Norton -- |

FOREIGN PATENT DOCUMENTS, insert the following reference after "EP 043 8061 A1 07/1999" -- EP 0625 781 A2 11/1994 --

UNITED STATES PATENT AND TRADEMARK OFFICE
CERTIFICATE OF CORRECTION

PATENT NO.    : 6,366,286 B1
DATED         : April 2, 2002
INVENTOR(S)   : David W. Hermanson It is certified that error appears in the above-identified patent and that said Letters Patent is hereby corrected as shown below:

Item [56], FOREIGN PATENT DOCUMENTS, cont'd,
Insert the following references after "GB2272127 A 05/1994"

-- GB2280778 A    02/1995
   GB2295482 B    05/1996
   GB2300535 A    11/1996
   GB2306750 A    05/1997
   GB2312078 A    10/1997 --

Signed and Sealed this

Twenty-seventh Day of May, 2003

JAMES E. ROGAN
*Director of the United States Patent and Trademark Office*